United States Patent
Kao

(10) Patent No.: US 7,080,931 B2
(45) Date of Patent: Jul. 25, 2006

(54) MULTIPLE PATTERN LIGHT SOURCE

(75) Inventor: Cheung Chong Kao, Chai Wan (HK)

(73) Assignee: Boto (Licenses) Limited, Douglas (GB)

( * ) Notice: Subject to any disclaimer, the term of this patent is extended or adjusted under 35 U.S.C. 154(b) by 110 days.

(21) Appl. No.: 10/785,583

(22) Filed: Feb. 24, 2004

(65) Prior Publication Data

US 2005/0185420 A1    Aug. 25, 2005

(51) Int. Cl.
*A41G 1/00* (2006.01)
(52) U.S. Cl. .................................. 362/567; 362/568
(58) Field of Classification Search ................ 362/554, 362/559, 563–564, 567–568, 581
See application file for complete search history.

(56) References Cited

U.S. PATENT DOCUMENTS

| | | | | |
|---|---|---|---|---|
| 2,286,737 A * | 6/1942 | Hills | ........................ | 116/62.3 |
| 3,536,908 A * | 10/1970 | Oster | ........................ | 40/431 |
| 3,564,233 A * | 2/1971 | Cox et al. | ........................ | 40/444 |
| 3,766,376 A * | 10/1973 | Sadacca et al. | ........................ | 40/433 |
| 4,279,089 A * | 7/1981 | Murakami | ........................ | 40/547 |
| 5,820,248 A * | 10/1998 | Ferguson | ........................ | 362/123 |
| 6,039,453 A * | 3/2000 | Wang | ........................ | 362/101 |
| 6,299,339 B1 * | 10/2001 | Chu | ........................ | 362/567 |
| 6,431,740 B1 * | 8/2002 | Puleo | ........................ | 362/568 |
| 6,679,622 B1 * | 1/2004 | Kao | ........................ | 362/567 |
| 6,755,554 B1 * | 6/2004 | Ohmae et al. | ........................ | 362/293 |
| 6,811,279 B1 * | 11/2004 | Coleman et al. | ........................ | 362/101 |

* cited by examiner

*Primary Examiner*—Renee Luebke
*Assistant Examiner*—Robert May
(74) *Attorney, Agent, or Firm*—Camille L. Urban; G. Brian Pingel; Adam W. Jones

(57) ABSTRACT

The present invention provides an apparatus to light an object. One end of each optical fiber in a group is bound into a bundle and the other is distributed to provide light as desired. There are more than one group of fibers and more than one bundle. A base structure includes a motor assembly, multiple light sources and a light governing disk with concentric tracks. Each track provides a different light pattern. The bundles are associated with the base structure and positioned such that one light source directs light through one said concentric track to one said bundle. Upon actuation, the motor turns the light governing disk so that one concentric track on the light governing disk moves between a light source and a bundle and the ends of the fibers in that bundle reflect the light pattern on the concentric track.

9 Claims, 5 Drawing Sheets

MULTIPLE PATTERN LIGHT SOURCE

BACKGROUND OF THE INVENTION

1. Field of the Invention

The present invention relates in general to an apparatus for providing light through optical fibers and, more specifically, to an apparatus which utilizes more than one light source and at least two bundles of optical fibers to provide multiple patterns of light and colored light.

2. Description of the Prior Art

It is known in the art to use optical fibers and a light source to convey light to various locations. It is also known in the art to subject the ends of a bundle of these fibers to light filtered through a turning color wheel such that the light which is conveyed alternates in color. Similarly, if it is desired that different portions of the lighted object exhibit different colors simultaneously, it is known in the art to employ a plurality of bundles, each provided with its own light source through a color wheel. Each bundles' fibers are then distributed over the object to be lighted such that light is delivered accordingly. Each light source may also be provided its own color wheel.

The present invention differs from the above referenced inventions and others similar thereto in that these prior devices did not provide a separate lighting pattern for each bundle of optical fibers. The present invention uses a light governing disk which turns past and between at least two spaced apart and separate bundles of fibers and two spaced apart and separate light sources. The light governing disk is provided with multiple concentric tracks such that, for example, an inner track may present alternating colors and an outer track may present intermittent black bars to provide a twinkling effect. Due to the unique base structure and complementary bundle assembly, the light filtered from one light source through one track reaches only one bundle of optical fibers thereby generating a light pattern specific and unique to that bundle of fibers.

Objectives of the present invention include providing a simply constructed, sturdy device which allows a variety of light patterns to be employed simultaneously.

SUMMARY OF THE INVENTION

The present invention provides an apparatus to light an object by utilizing a plurality of groups of optic fibers bound into bundles and a light governing disk. Concentric tracks on the light governing disk provide different light patterns. The apparatus comprises a base structure in which at least two light sources, the light governing disk, and a motor reside. The light governing disk turns with a spindle connected to said motor. The apparatus further comprises a bundle assembly associating the bundles and positioning them with the base structure. A plurality of source-bundle pairs is formed when each light source is positioned to direct light to one fiber optic bundle. One concentric track on the light governing disk moves between the elements of a source-bundle pair. The source-bundle pairs are positioned relative to the placement of the disk and its concentric tracks so that each bundle of fibers is provided light in a pattern dictated by one of the concentric tracks.

In the preferred embodiment, the apparatus is incorporated into an artificial Christmas tree. The tree includes a trunk section and branches along with the bundle assembly and base structure as described above. A first end of each optical fiber is placed somewhere in the branches. The bundle assembly comprises a plurality of second ends of optical fibers gathered into one of the plurality of groups, each group provided means for securing the group together to form a bundle. The bundle assembly further comprises means for associating said bundles with said base structure. Means for securing the group in a bundle in the preferred embodiment is a sleeve element and means for associating said bundles with said base structure are generally cylindrical openings in a cover said cover being of a shape and size to cover the base structure. The generally cylindrical openings are spaced apart from one another such that the bundles are also spaced apart from one another.

As the light governing disk turns, one of its concentric tracks passes between a source-bundle pair and another concentric track passes between another source-bundle pair. Each concentric track bears a different light pattern either by color bars or intermittent black bars. Conceivably, then, some of the optic fibers will blink and some will alternate in color based on which source-bundle holds the second end of the optical fiber. It is also possible that one concentric track may run between more than one source-bundle pair and, because different portions of the track will pass through the pairs at different times, the light patterns emitted by one concentric track can be multiplied.

Other objects, features, and advantages of the present invention will be readily appreciated from the following description. The description makes reference to the accompanying drawings, which are provided for illustration of the preferred embodiment. However, such embodiment does not represent the full scope of the invention. The subject matter which the inventor does regard as his invention is particularly pointed out and distinctly claimed in the claims at the conclusion of this specification.

DESCRIPTION OF THE PREFERRED EMBODIMENT(S)

Figure 1:
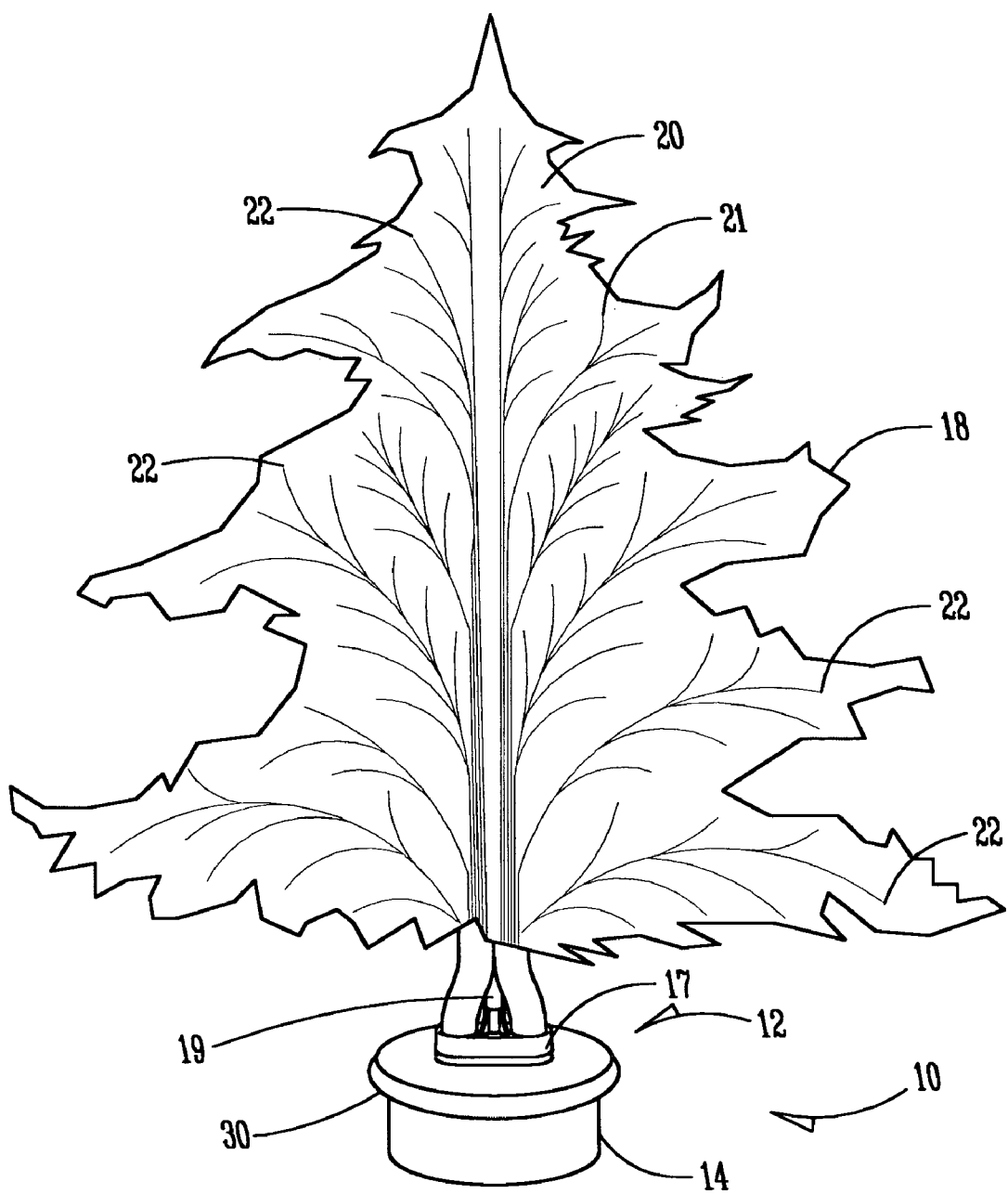
FIG. 1 is a perspective view of an ornamental tree embodying the present invention.

Turning now to the drawings and with reference to FIG. 1, a preferred embodiment of a multi-color illuminating apparatus 10 of the present invention is shown. The apparatus 10 comprises a base structure 14, and a bundle assembly 12 and is incorporated in an artificial Christmas tree 18. Further comprising the tree 18 is a trunk 19, means for associating said trunk section with said bundle assembly 17 and a plurality of branch members 20. A plurality of optic fibers 21 is associated with said tree 18. Each fiber comprises a first end 22 and a second end 23 wherein each said first end 22 is placed among said branches 20.

The base structure 14 comprises a housing 30 which is preferably of a generally round shape to resemble other Christmas tree stands and of a diameter suitable to maintain the balance of the tree 18 to prevent it from falling over.

Figure 2:
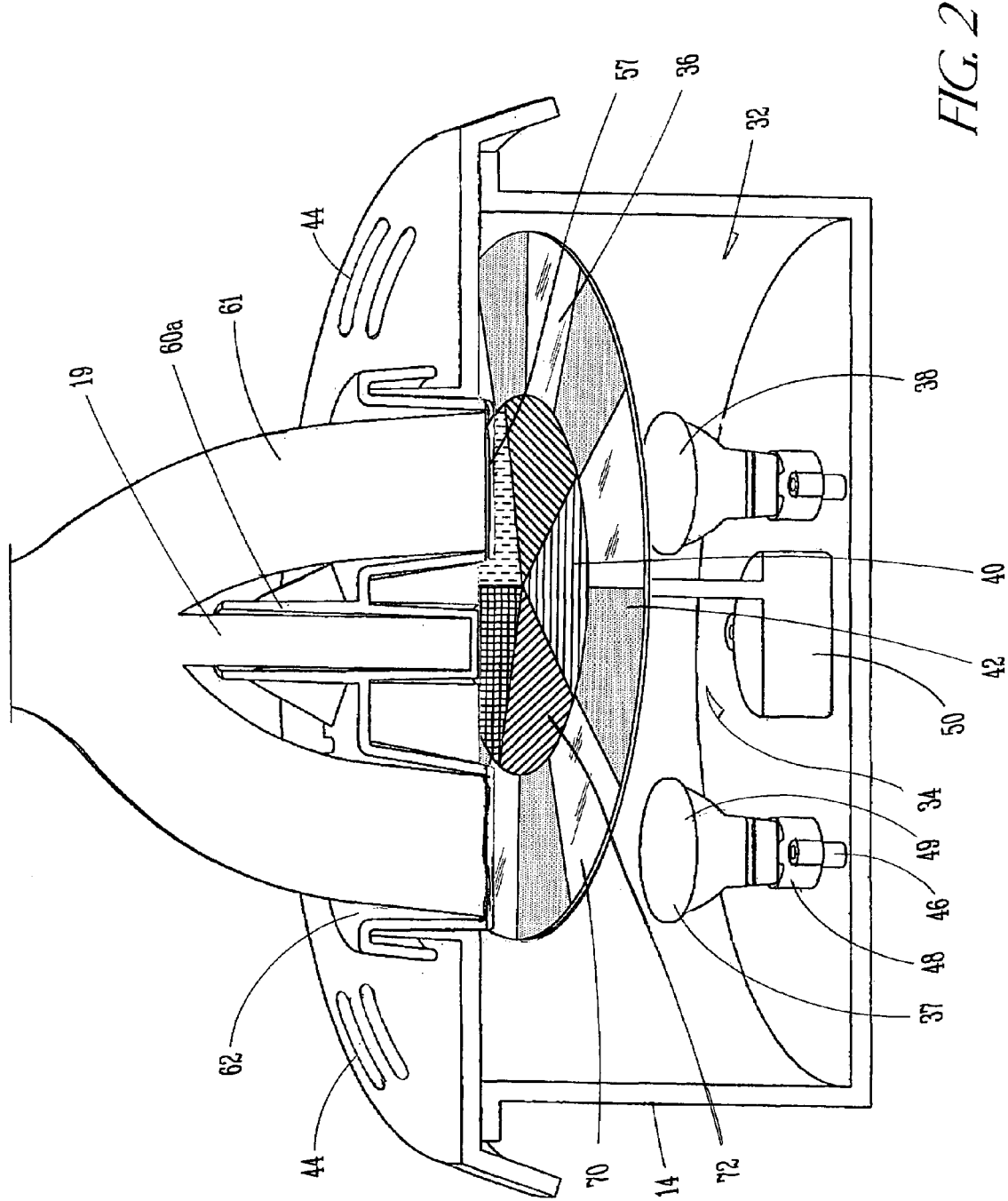
FIG. 2 is an exploded view of the ornamental tree of FIG. 1 showing the base structure, the cover, and the bundle assembly of the present invention.
Figure 3:
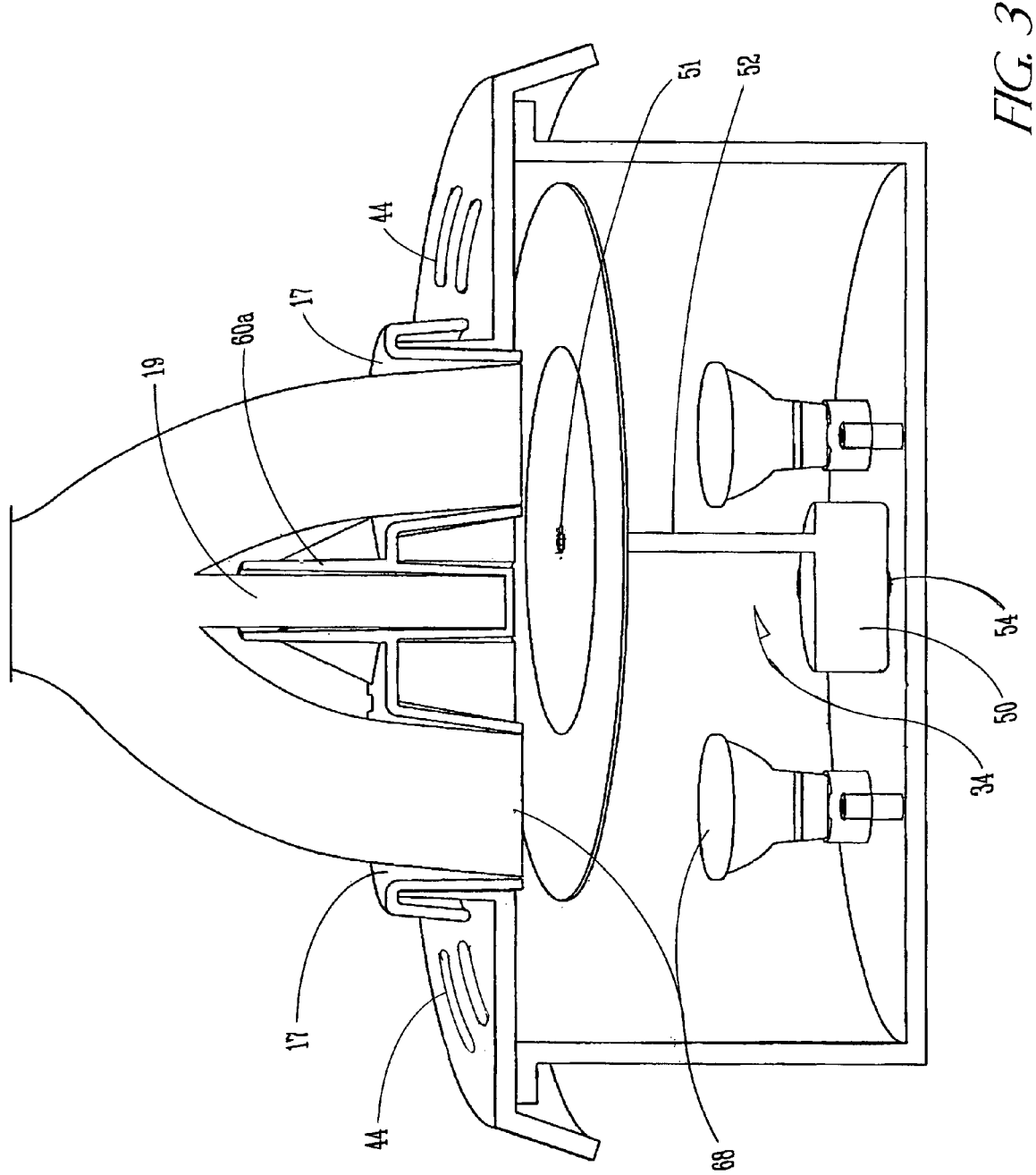
FIG. 3 is a cut-away perspective view of the internal part of the base structure.
Figure 4:
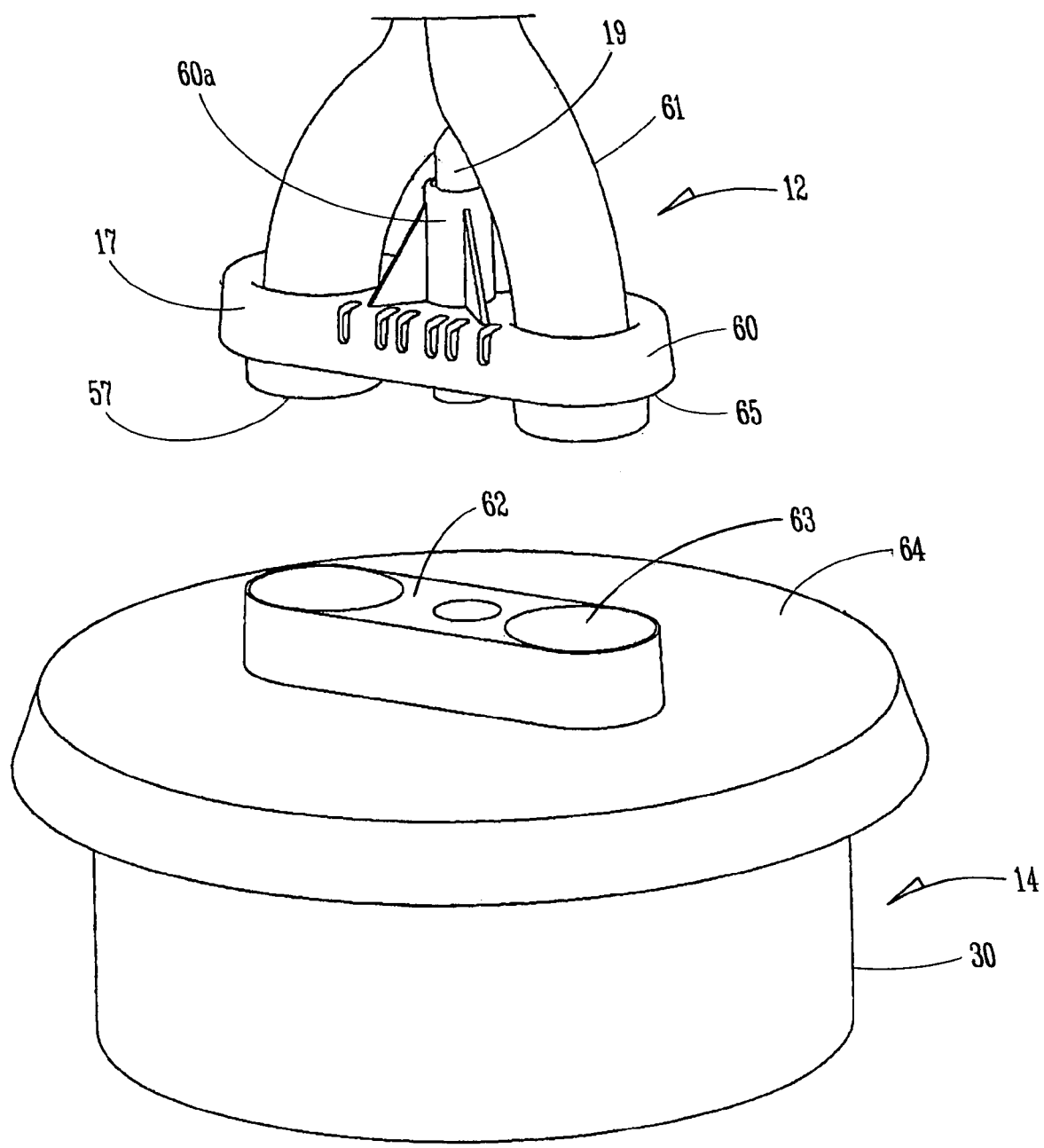
FIG. 4 is a perspective view of the top of the cover of the base structure.
Figure 5:
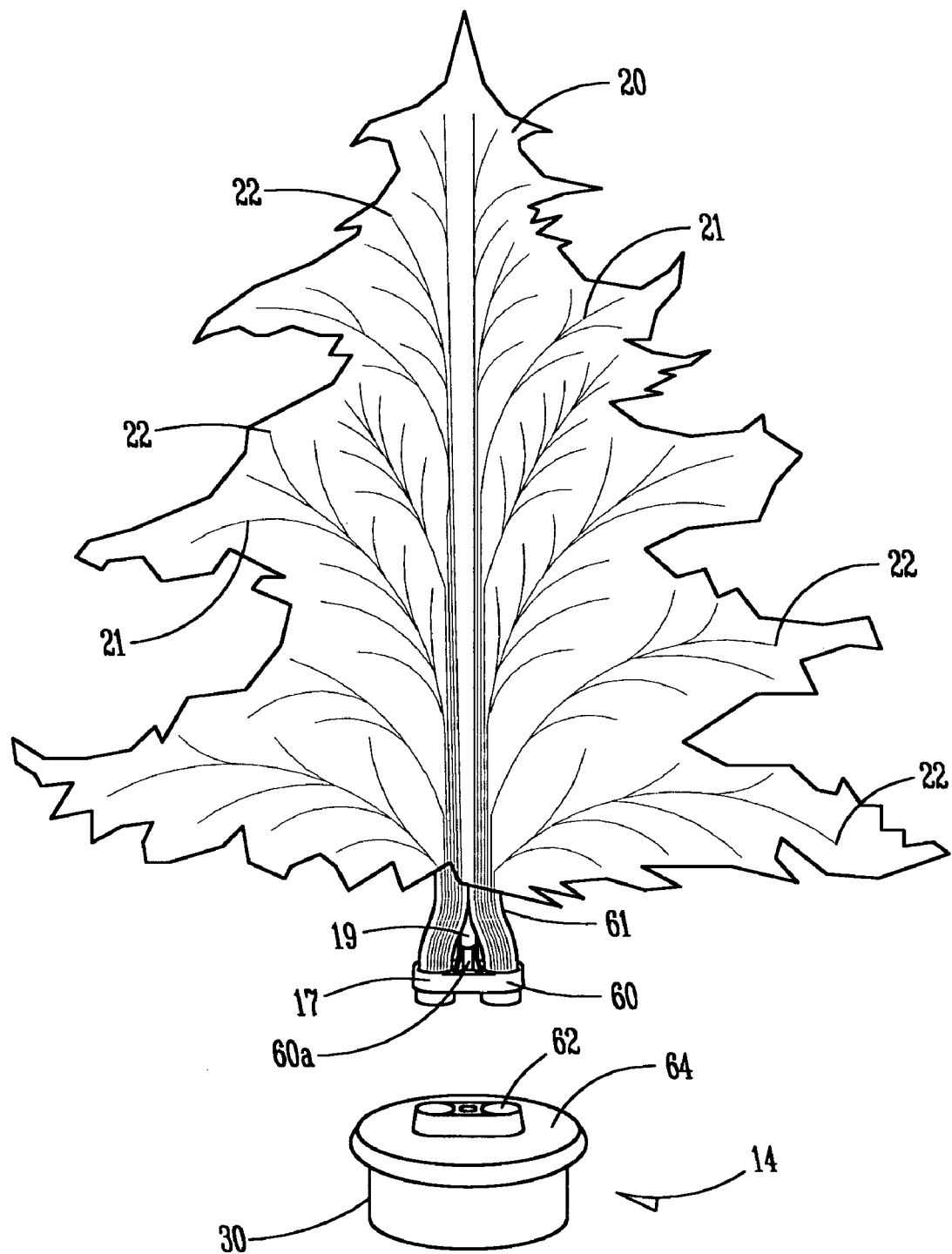
FIG. 5 is a partial cut-away showing the internal elements of the base structure, the cover, the bundle assembly, and the placement of optical fibers in the ornamental tree of the present invention.

Referring now to FIG. 2, the base structure 14 further comprises an interior 32, a motor assembly 34, a light governing disk 36, a first light source 37, a second light source 38, a first concentric track 40, and a second concentric track 42, and venting means 44. Each light source 37 and 38 comprises a mounting bracket 46 by which the source 37 or 38 is attached to the base structure 14, a lamp holder 48, and a lamp 49. In the preferred embodiment, said housing 30 is made of molded plastic and each said bracket is integrally molded with said housing.

In the preferred embodiment, the motor assembly 34 comprises a synchronous motor 50, a hub 51, a spindle 52 which is turned by the motor 50, a second mounting bracket 54 by which the motor assembly 34 is attached to the base structure 14 and means to receive electrical power such as an electric cord as is well known in the art. In the preferred embodiment, means to receive electrical power comprises an electrical cord plugged in to an outlet.

The bundle assembly 12 comprises means for securing said second ends of said fibers 60 and forming a plurality of bundles 61, and means for associating each said bundle with said base structure 62. In the preferred embodiment, means for securing said second ends into bundles 60 comprises a sleeve element. A top cover 64 is provided in which means for associating each said bundle with said base structure 62 are positioned. The cover 64 fits at least partially within and on top of the base structure 14 for aesthetic purposes and, like the base structure, is made of molded plastic. In the preferred embodiment, said sleeve 60 comprises at least one closed end 57 that is transparent or semi-transparent and near which said second ends 23 are positioned, a stop in the form of a lip 65 encircling said sleeve 60, and means for associating each said bundle with said base structure 62 comprises openings or generally cylindrical tubes 63 in which each said closed end 57 of said sleeve element 60 is inserted until the stop 65 is reached. Means for associating each said bundle with said base structure 62 are positioned such that one of said light sources directs light to one said bundle forming a source-bundle pair 68. In the preferred embodiment, means for associating said trunk with said bundle assembly 17 comprise integrally associating each said sleeve element 60 and an adaptor 60a into which said trunk 19 is securely fitted.

The housing 30 comprises venting means formed of slots 44 in the preferred embodiment to allow heat generated by said light sources 37 and 38 to escape. A modification of the invention may comprise a housing 30 which has a top surface instead of a cover wherein said means for associating each said bundle with said base structure are positioned.

In operation, upon application of electric power, the motor 50 turns the spindle 52 and the light governing disk 36. Each concentric track 40 and 42 on the light governing disk 36 passes between at least one source-bundle pair 68 thereby imparting a pattern of light, (color changes caused by color bars 70 and blinking changes caused by alternating dark and clear bars 72) to that bundle of fibers 61. The distribution of the first ends of the fibers 22 then dictates where each pattern will appear.

Thus, the present invention has been described in an illustrative manner. It is to be understood that the terminology that has been used is intended to be in the nature of words of description rather than of limitation.

Many modifications and variations of the present invention are possible in light of the above teachings. For example, more than two tracks, and therefore, more than two bundles of fibers could be employed. In addition, the use of this apparatus is not to be interpreted as restricted in any way to holiday decorations. There are many other ways in which the apparatus could be employed. Therefore, within the scope of the appended claims, the present invention may be practiced otherwise than as specifically described.

What I claim is:

1. An apparatus to provide multiple patterns of illumination comprising:
    a) a first plurality of optical fibers each with a first end and a second end;
    b) a base structure comprising a housing, more than one light source, a motor assembly, and a light governing disk;
    c) a bundle assembly comprising a cover, means for securing said second ends of said fibers and forming a plurality of bundles, and a top cover with spaced apart openings for associating said bundles with said base structure such that each bundle receives light from one of said light sources forming a source-bundle pair;
    d) said light governing disk comprising at least two concentric tracks comprising a first track including successive transparent color bars and a second track including alternating monochromatic dark and light bars; and
    e) said motor assembly comprising means for turning said light governing disk such that each concentric track travels between at least one source-bundle pair.
    f) a trunk;
    g) a plurality of branches such that said first ends of said optical fibers are dispersed among said branches;
    h) means for associating said trunk with said bundle assembly;
    i) said means for securing said fibers to form said bundles includes a sleeve element for each bundle; and
    j) said sleeve element includes one closed and at least semi-transparent end near which said second ends of said fibers are positioned and a stop.

2. The apparatus to provide multiple patterns as claimed in claim 1 wherein said means for associating each said bundle with said base structure further comprises cylindrical tubes through said openings in said cover, wherein each said sleeve element is inserted in one said cylindrical tube until said stop rests against said tube.

3. The apparatus to provide multiple patterns as claimed in claim 1 wherein said means for associating said trunk with said bundle assembly comprises an adaptor into which said trunk is securely fitted and with which said sleeves are integrally associated.

4. The apparatus to provide multiple patterns as claimed in claim 1 wherein each of said light sources further comprises a mounting bracket integral with said interior of said base structure, a lampholder, and a lamp.

5. The apparatus to provide multiple patterns as claimed in claim 1 wherein said base structure further comprises venting means including slots into said interior for allowing heat generated by said light sources to escape.

6. The apparatus to provide multiple patterns as claimed in claim 1 wherein said motor assembly further comprises a spindle and a motor.

7. The apparatus to provide multiple patterns as claimed in claim 6 wherein said light governing disk is associated with said spindle of said motor assembly such that upon actuation of said motor said light governing disk turns.

8. An apparatus to provide multiple patterns of illumination comprising:
    a) a trunk;
    b) a plurality of branches;

c) a first plurality of optical fibers each with a first end and a second end, said first ends dispersed among said branches;

d) a base structure comprising a housing, more than one light source, a motor assembly, and a light governing disk comprising more than one concentric track;

e) said motor assembly comprising a motor, a spindle turned by said motor and with which said light governing disk is associated and turned;

f) a bundle assembly comprising means for securing said second ends of said fibers and forming bundles and a top cover with spaced apart openings for associating said bundles with said base structure wherein said spaced apart openings are positioned such that each bundle receives light from one light source forming a source-bundle pair and directed through one said concentric track;

g) said means for securing said second ends of said fibers and forming said bundles comprise a sleeve for each said bundle said sleeve comprising a closed and at least semi-transparent end near which said second ends of said fibers are positioned; and h) an adaptor for associating said trunk with said bundle assembly into which said trunk is securely fitted, with which each said sleeve is integrally associated, and formed complimentary to said top cover.

9. The apparatus to provide multiple patterns as claimed in claim 8 wherein said more than one concentric track comprise a first track including a sequence of color bars and a second track including a series of dark and light bars such that as said light governing disk is turned by said motor a portion of said plurality of said first ends of said fibers distributed in said branches changes color and a portion of said plurality of said first ends of said fibers distributed in said branches blinks.

* * * * *